UNITED STATES PATENT OFFICE.

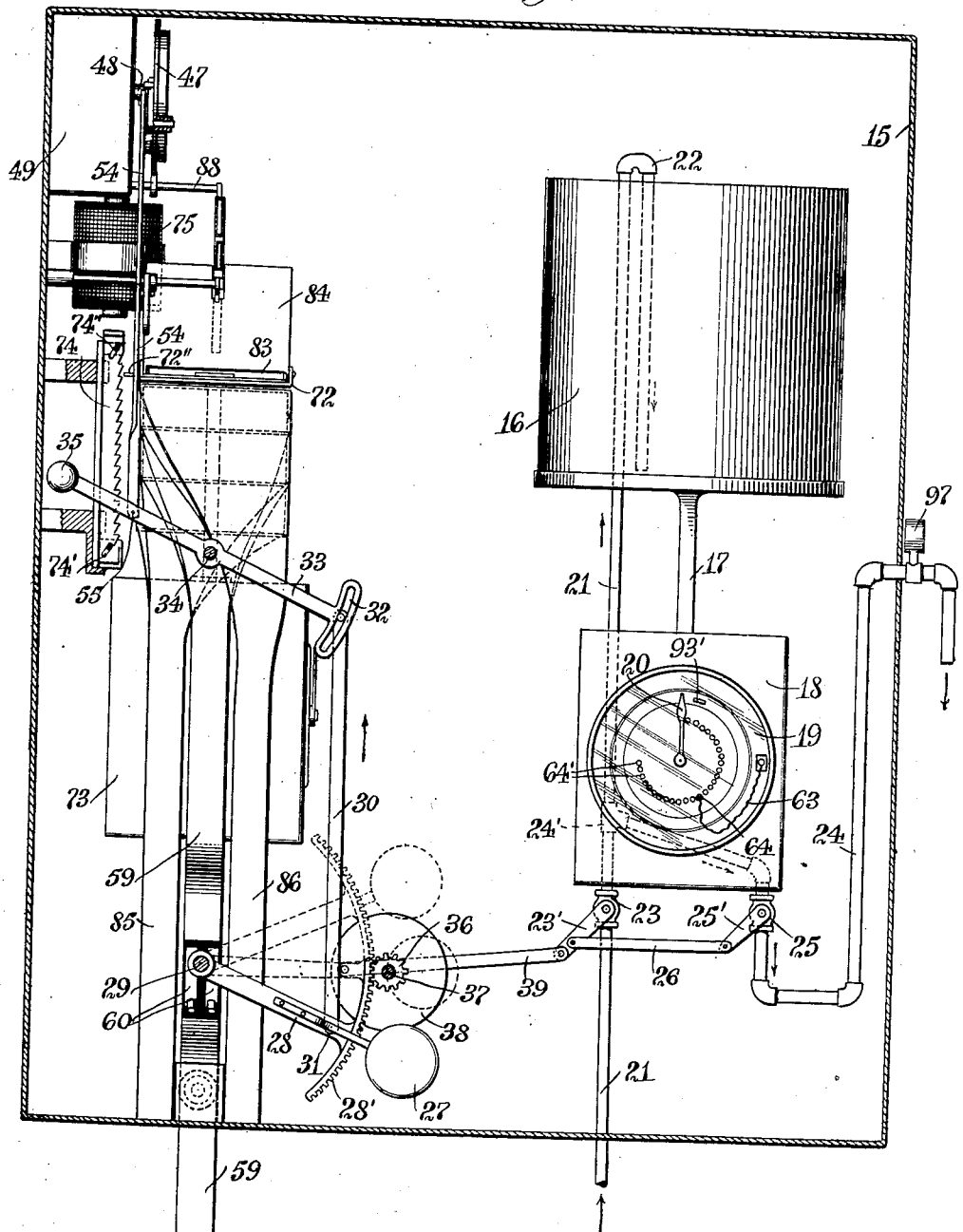

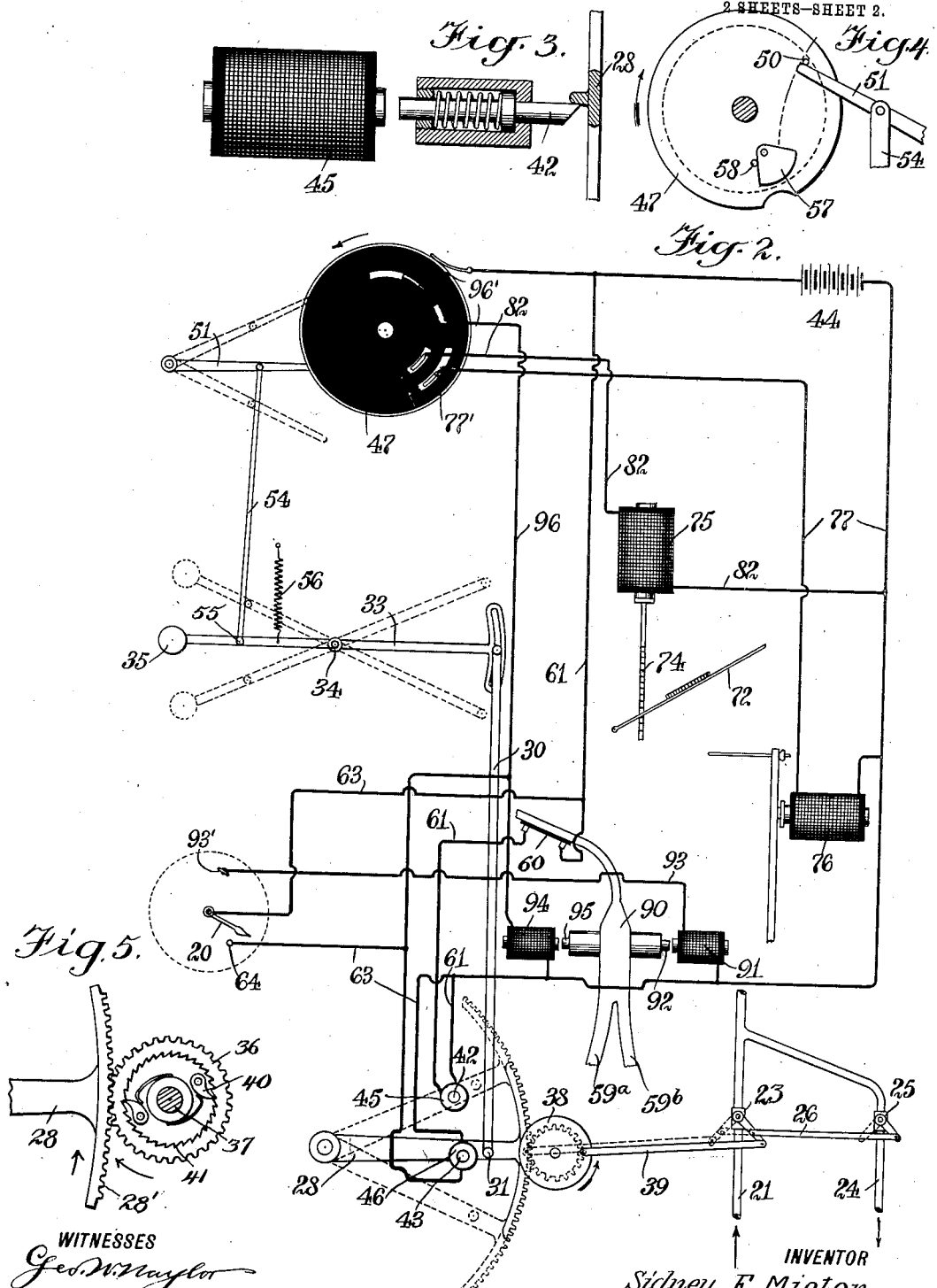

SIDNEY F. MIOTON, OF NEW ORLEANS, LOUISIANA.

AUTOMATIC GASOLENE-SERVICE.

1,133,167.  Specification of Letters Patent.  Patented Mar. 23, 1915.

Application filed January 8, 1914. Serial No. 811,069.

*To all whom it may concern:*

Be it known that I, SIDNEY F. MIOTON, a citizen of the United States, and a resident of New Orleans, in the parish of Orleans and State of Louisiana, have invented a new and Improved Automatic Gasolene-Service, of which the following is a full, clear, and exact description.

This invention relates to improvements for dispensing liquids, and has particular reference to apparatus for dispensing predetermined quantities of liquids by means of coin controlled mechanism.

While the device in all of its essential characteristics is adapted for dispensing various varieties of liquids, my object primarily is to provide a means of the character indicated adaptable for supplying gasolene or the like for automobile use, at any time of the day or night, and without requiring the presence of the owner or attendant to assist in such delivery.

Among the special objects of this invention is to provide a mechanism of a simple and reliable nature, whereby the machine may be readily adjusted so as to deliver a proper quantity of liquid according to variable prices therefor.

The foregoing and many other objects of the invention will hereinafter be more fully described and claimed and illustrated in the drawings forming a part of this specification in which like characters of reference indicate corresponding parts in all the views, and in which Figure 1 is a front elevation of the invention, partly in section and with the face of the casing removed, the parts being shown in normal position; Fig. 2 is a diagram indicating the several magnets and the parts associated therewith; Fig. 3 is a view of one of the magnetically controlled pawls coöperating with the actuator; Fig. 4 is a detail view showing the starting mechanism; and Fig. 5 is a detail of the valve actuator mechanism.

The several parts of the device may be made of any suitable materials, and the relative sizes and proportions, as well as the general design of the mechanism, may be varied to a considerable extent, without departing from the spirit of the invention hereinafter more fully set forth and specifically claimed.

At 15 I show a casing adapted to be supported in position for convenient access and adapted to contain the principal working parts of the invention above referred to. Said casing incloses, among other things, a fluid tank 16 supported by a stem 17 upon a weighing device 18 including a dial 19 and a pointer 20. The weighing device 18 is secured in fixed position and the tank 16, as it becomes filled with the fluid for delivery to the customer, sinks downwardly under its load, causing the pointer to travel over the dial 19 until it reaches the point at which the device is set for delivery of the proper amount of fluid. The fluid to be dispensed may be delivered into said tank from any suitable source of supply (not shown) through a pipe 21 leading upwardly through the bottom of the casing and communicating with the interior of the tank 16 by means of a goose neck or siphon 22. The short leg of the siphon is adapted to extend close to the bottom of the tank when the latter is in its normal empty position, as shown in Fig. 1. The flow of fluid upwardly through the pipe 21 is controlled by a normally closed valve 23. An outlet pipe 24 communicates with the main pipe 21 at 24' at any suitable point between the valve 23 and the siphon. Said outlet pipe leads to the outside of the casing and is adapted to discharge into any receptacle provided for or by the customer, and the outward flow from the tank 16 through the pipe 24 is controlled by a normally open valve 25.

Any suitable means may be provided to control the movement of the valves 23 and 25. I prefer for this purpose mechanism including a link 26 connecting the valve arms 23' and 25', whereby said valves are caused to move simultaneously to open and closed positions respectively. As a convenient means for operating the valves I provide a weight 27 carried rigidly upon a gear segment 28 pivoted at 29. Said gear segment and weight are adapted to be lifted by means of a rod 30 pivoted at its lower end at 31 to the gear segment and having pin and slot connection at 32 at its upper end to a lever 33 pivoted at 34 and having an operating handle 35 projecting through the front wall of the casing whereby the customer, upon depressing the handle 35, will store power through the weight 27 for actuating the valves. The teeth 28' of the actuator segment have constant meshing engagement with a pinion 36 journaled freely upon a shaft 37. See Fig 5. The shaft also carries a disk 38 having a pitman 39 extending therefrom to the arm 23' above described. The pinion may rotate freely in one direction while the actuator segment 28 is being lifted, but when the weight descends the pinion 36 will be clutched as by means of pawls 40 and a ratchet wheel 41 to cause the rotation of the shaft 37 and said disk, and a corresponding movement of the valves. The number of teeth of the pinion 36 and gear segment and the extent of movement of the actuator are so designed as to provide for one complete rotation of the pinion during each complete oscillation of the segment. When the segment is lifted, its arm will be engaged and momentarily held by means of a spring pressed pawl 42. Another such pawl is shown at 43 and is adapted to support the actuator at or about the middle of its downward oscillation. When the segment 28 is lifted there will be no movement of the disk 38 nor of the valves, but while the segment moves from the pawl 42 to the pawl 43 the pinion and disk will be given one half of a rotation with a corresponding movement of the pitman 39 from the position shown in Fig. 1 to that shown in full lines in Fig. 2, whereby the valves will be shifted; that is to say, the valve 23 will be opened and the valve 25 will be closed. Subsequently, when the actuator continues its downward movement, or from the position shown in Fig. 2 to its normal position, the disk will be given another half rotation, whereby the valves will again be changed and returned to their normal position.

Any suitable means may be employed to control the pawls 42 and 43 for the purposes above indicated. A suitable means for this purpose is a battery 44, magnets 45 and 46, and suitable wiring whereby the magnets are caused to be energized automatically and in succession.

The controlling means for the aforesaid magnets and other devices includes a disk 47 adjacent the upper part of the casing and connected to a shaft 48 of any suitable type of motor 49. Said disk 47 has on one face a stop pin 50 which, when the disk makes one complete rotation, will engage a movable finger 51 pivoted to a bar 54 having direct connection to the above mentioned operating lever 33. The point of connection 55 between said bar and the lever being between the handle and the pivot 34 provides for the downward movement of the finger 51 when the customer manipulates the handle 35. The handle 35 is lifted automatically and maintained in normally elevated position by virtue of a strong spring 56, the force of which is superior to the power of the motor 49 tending to rotate the disk 47. When, however, the handle 35 is depressed, and the finger 51 moves downwardly, the power of the motor 47 causes the disk to rotate in the direction indicated and with the stop pin 50 following the movement of the finger. Said disk, however, at a point remote from the stop pin 50, is provided with a swinging pawl 57 hanging normally against a stop pin 58, the arrangement being such that should the motor fail to initiate the movement of the disk 47, the finger 51 by contact with said pawl will start the movement of the disk positively. The stop pin 50 passing beyond the path of the finger 51 will continue in its rotation until it is stopped by the finger 51, while the latter is under the force of the spring 56, at its normal position.

As illustrated this apparatus is designed to be operated in connection with coin controlled devices including a tube 59 having in its bottom normally spaced contacts 60 constituting a part of a circuit 61 from the battery through the magnet 45. As the coin glides down the chute 59 and comes into engagement with and bridges the contacts 60, the magnet 45 will be energized momentarily. The pawl 42 constitutes the armature of said magnet and hence, when the magnet is energized, the actuator 28 will be allowed to drop until it is engaged and held by the pawl 43, as above described, this movement opening the valve 23 to admit a quantity of fluid into the tank 16. The pawl 43 constitutes the armature of the magnet 46 which is in the circuit 63 including the pointer 20 of the scale mechanism above described. 64 indicates a movable stop pin adapted to be inserted into any one of a series of holes 64', whereby I am able to fix the stop pin 64 according to the price of the commodity to be dispensed or the amount thereof to be determined; that is to say, the fluid being dispensed will enter the tank 16 and depress the same, causing the pointer 20 to progress around or across the dial 19 until the desired weight of fluid is received in the tank. The pointer 20 then coming into contact with the pin 64 will complete the circuit through the circuit wires 63 and the magnet 46, allowing the actuator to drop to normal position and close the admission valve 23 and providing for the discharge of the fluid through the pipe 24 and valve 25. As the fluid flows from the tank, it and the pointer 20 will be returned to normal position.

A coin introduced into the machine by a customer is deposited upon a scale pan 72, the scale 73 of which is for the purpose of detecting and discharging to inoperative position a false coin or one which is too heavy or too light.

74 indicates a toothed bar which is adapted to be lifted by a magnet 75 to tilt the pan to discharge the coin therefrom. At 76 I show an electromagnet in the circuit 77 including a pair of contacts 77', one of which is carried by the disk 47, the contacts completing the circuit 77 shortly after the disk 47 begins its rotation but after the coin has been received by the pan 72. Subsequently the disk will complete a circuit 82 energizing the magnet 75, the armature of which is or carries said toothed bar 74 which, engaging with a lip 72" of the pan 72, will lift the pan causing the coin to slide therefrom and through an opening 83. If the weight of the coin is proper, it will be delivered along the tube 59. If it is light it will be delivered into an auxiliary tube 85, or, if it is too heavy the delivery will take place into a tube 86, these last mentioned tubes leading into the bottom of the casing and no operation of the machine will result. The armature bar 74 is normally at one side of the vertical plane of the lip 72" but is caused to shift laterally, as shown in Fig. 1, by means of diagonal slots 74' coöperating with fixed points 74".

For the automatic disposition of used good coins, the lower end of the chute 59 delivers the coin into and through a switch casing 90. A magnet 91, of which the plunger 92 is the armature, is arranged in a circuit 93 having a contact point 93' adapted to be engaged by the scale pointer 20 just after said pointer starts to move. When said circuit 93 is completed, and the magnet 91 energized, the coin will be delivered downwardly through a chute 59ᵃ. The other magnet 94, of which the plunger 95 is the armature, is in a circuit 96 having contacts 96' adapted to be completed when the disk 47 approaches the end of its rotation. When the magnet 94 is thus energized, the coin is delivered to a branch chute 59ᵇ and returned to the customer when there is no fluid to be delivered.

At 97 I show what may represent a suitable form of meter attached to the outlet pipe 24 and intended to serve at least two different purposes; first, to indicate to the customer the amount of fluid delivered to him, and secondly, to show to the attendant at any time a reading of the condition of the supply or storage tank which may be located under the ground for operation by compressed air, or which may be located at some elevated point whereby delivery may be made therefrom to the tank 16 by gravity, or some other means.

Having thus described my invention, I claim as new and desire to secure by Letters Patent:—

1. In a device of the class set forth, the combination of a tank, scale mechanism supporting said tank, means to deliver fluid into said tank, said means including a pipe having a siphon at its upper end, a normally closed valve in said pipe, an outlet pipe communicating with the aforesaid pipe between the valve and the siphon, a normally open valve in the first mentioned pipe, means connecting said valves for simultaneous movement, an actuator serving first to open the inlet valve and close the outlet valve, and means operated by the movement of the tank when filled to a predetermined extent for reversing the position of said valves, causing the inflow to cease and permitting the siphon to discharge the contents of the tank.

2. In a device of the character set forth, the combination of a tank, means to deliver fluid thereinto, an outlet pipe, said means and pipe being provided with valves to control the inflow and outflow in succession, and an actuator to operate said valves, said actuator comprising a pivoted gear segment carrying a weight, a pinion meshing with said segment and adapted to run idly while the segment is moved in one direction, a disk and pitman connection with the valves, and pawl and ratchet devices serving when the gear segment moves in the other direction to cause first the movement of the valves in one direction and subsequently movement in the opposite direction.

3. In a device of the character set forth, the combination of an oscillating movable gear segment carrying a weight and means to lift the gear segment and its weight, a pair of pawls so arranged with respect to the segment as to provide for temporarily supporting the weighted segment at different positions, a tank, means to deliver material into the tank, means to deliver material from the tank, connections between the gear segment and said delivering means, and means to control the operation of said pawls in succession whereby the two delivery means are caused to operate in succession from said segment.

4. In a device of the character set forth, the combination of an inlet valve, an outlet valve, a link connecting said valves for simultaneous movement, one to opened and the other to closed position, an actuator for controlling the position of said valves, the actuator comprising a pivoted gear segment, a pinion meshing therewith, a disk, pawl and ratchet connection between the pinion and the disk, and a pitman connecting said disk with said valves, and means to control the operations of the actuator.

5. In a device of the character set forth, the combination of inlet and outlet pipes, valves in said pipes, means connecting said valves for simultaneous movement, an actuator for said valves including a weighted movable member, a pair of magnets acting in succession upon said member to regulate its descent under gravity whereby the valves are given two movements, a battery, and independent circuits leading from the battery to said magnets.

6. In a machine of the character set forth, the combination of a fluid tank, means to deliver fluid thereto and to discharge the same therefrom, an actuator to control the flow of fluid thereto and from said tank, said actuator including a weighted pivoted gear segment, means to lift said segment, a pair of pawls to control the descent of said segment, means to release the first pawl so as to permit the segment to pass and be received upon the second pawl to cause the inflow of fluid, and means operated as a result of said tank becoming loaded to withdraw the second pawl and allow the segment to drop to normal position, shutting off the inflow and permitting the discharge of the fluid.

7. In a device of the character set forth, the combination of a tank, means to deliver fluid thereto and therefrom, an actuator controlling said delivery, said actuator including a weighted arm, connections between said arm and said delivery controlling means, a pair of magnets associated with said arm, the armatures of said magnets constituting pawls adapted to act upon said arm in succession, a battery, said magnets being in normally open circuit with said battery, means under the control of the customer to complete the circuit to energize the first magnet, and automatic means controlled by the weight of the fluid in the tank to complete the circuit through the second magnet, substantially as set forth.

In testimony whereof I have signed my name to this specification in the presence of two subscribing witnesses.

SIDNEY F. MIOTON.

Witnesses:
HAROLD GAZIN,
FRED SCHAEFER.